June 14, 1960     D. T. McMANAMON     2,940,535
STEERING WHEEL POWER MECHANISM
Filed July 31, 1959     2 Sheets-Sheet 1
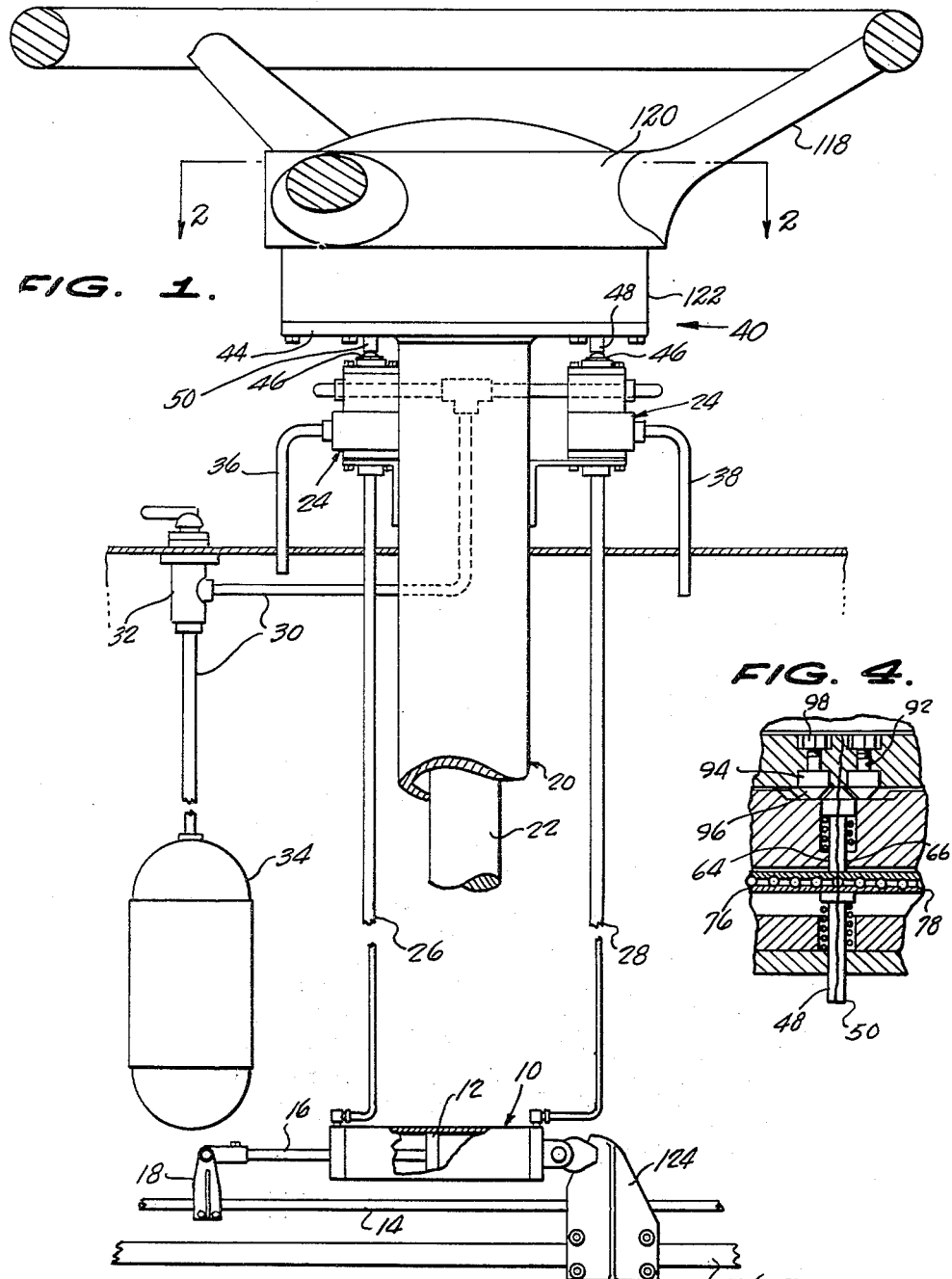
INVENTOR.
DEA T. McMANAMON,
BY
McMorrow, Berman + Davidson
ATTORNEYS.

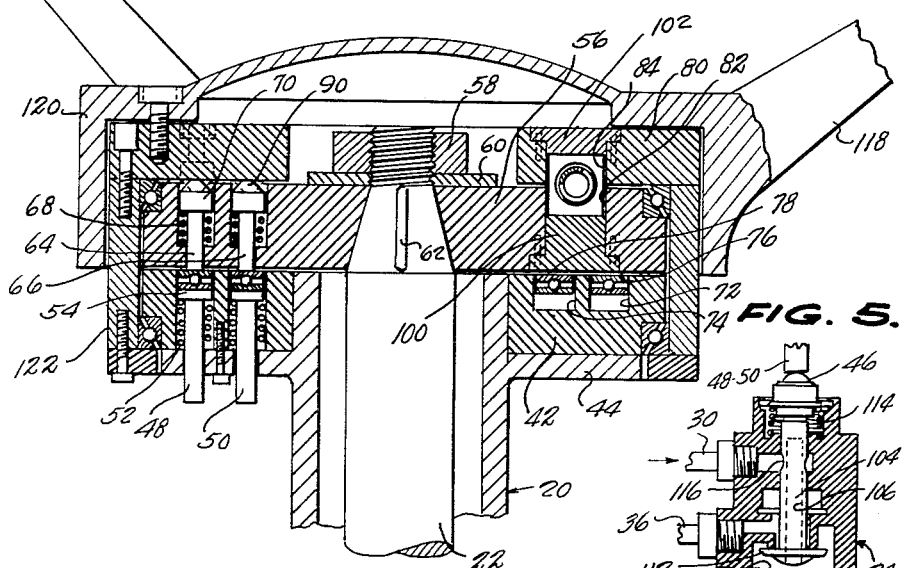
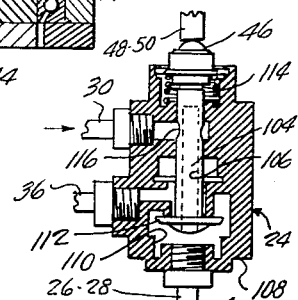
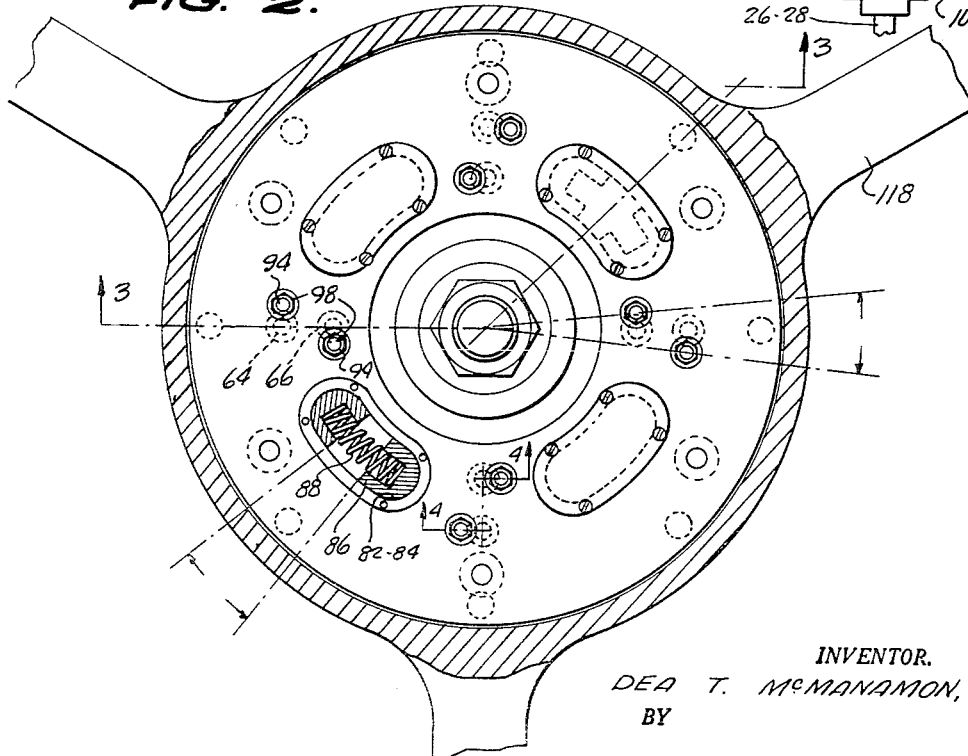

United States Patent Office 2,940,535
Patented June 14, 1960

2,940,535
STEERING WHEEL POWER MECHANISM
Dea T. McManamon, Rte. 4, Box 174, Chehalis, Wash.
Filed July 31, 1959, Ser. No. 830,919
6 Claims. (Cl. 180—79.2)

The present invention relates to vehicles generally and in particular to a steering wheel power mechanism.

Presently in use in vehicles are power steering mechanisms operatively connected to the tie rod of a vehicle steering apparatus and including air motors controlled by valves opened and closed responsive to movement of a component in the steering gear. The most common component employed to actuate the valves is the pitman arm of the steering gear, located at the lower end of the steering column and beneath the vehicle. When so located, the valve actuator is subject to dirt and water. The valve actuator, when located beneath the vehicle, is generally inaccessible for adjustment when the vehicle is in use. The location of the valve actuator at a place inaccessible to the vehicle operator is an objectionable feature and frequently the vehicle operator disengages the valve actuator and depends on manual steering rather than attempt adjustment of the valve actuator to road conditions and vehicle requirements.

An object of the present invention is to provide, in a power steering mechanism, a steering wheel power mechanism accessible to the vehicle operator and one protected from road gravel, dirt, and the elements.

Another object of the present invention is to provide, in steering wheel power mechanism, a valve actuator which is responsive to the turning movements of a steering wheel, one sensitive in control, one readily adjusted for road conditions and vehicle requirements, and one which is economically feasible.

A further object of the present invention is to provide, in a steering wheel power mechanism, a valve actuator which is sturdy in construction, one simple in structure requiring little or no alteration to the vehicle steering wheel assembly for installation therewith, and one which is highly effective in action.

These and other objects and advantages of the present invention will be fully apparent from the following description when taken in conjunction with the annexed drawings, in which:

Figure 1 is an elevational view, partially in section, of the upper end portion of a steering column, showing the power mechanism of the present invention installed thereon, the lower end portions of the column and steering shaft being broken away, and portions of the steering wheel being broken away, with a portion of the power mechanism shown attached to the vehicle tie rod;

Figure 2 is a view on an enlarged scale, taken on the line 2—2 of Figure 1;

Figure 3 is a view taken on the line 3—3 of Figure 2;

Figure 4 is a view on an enlarged scale, taken on the line 4—4 of Figure 2; and

Figure 5 is a sectional view of one of the valve assemblies employed in the power mechanism of the present invention.

Referring in greater detail to the drawings in which like numerals indicate like parts throughout the several views, in Figure 1, the reference numeral 10 designates an air cylinder and the piston 12 mounted therein for reciprocatory movement. The vehicle tie rod is designed by the reference numeral 14 and is connected to the piston 12 for movement therewith, the piston 12 being on one end of an actuating rod 16 having its other end pivotally connected to a clamp element 18 secured to the tie rod 14.

The reference numeral 20 designates generally a steering column, having a steering shaft 22 rotatable therein in clockwise and counterclockwise directions.

A pair of valve assemblies 24, each having a depressible spring-biased valve therein, are positioned exteriorly of and about the steering shaft 22 and are fixedly supported upon the steering column 20, as shown in Figure 1. The valve assemblies 24 are identical and one of them is shown in sectional view in Figure 5.

Conduits 26 and 28 connect the lower ends of the valve assemblies 24 to the opposed ends of the cylinder 10. A branched conduit 30, having a shutoff valve 32 therein, connects each of the valve assemblies 24 with a tank 34 holding a supply of air under pressure. The air within the tank 34 is kept under pressure by conventional means such as a pump located on the vehicle and driven by the vehicle engine.

The valve assembly 24 associated with the conduit 26 has an exhaust conduit 36 opening to the atmosphere, and the valve assembly 24 associated with the conduit 28 has a similar conduit 38 also exhausting to the atmosphere.

The present invention provides a power mechanism, designated generally by the reference numeral 40, the mechanism 40 including a fixed support 42, in the shape of a disc, mounted upon an annular plate 44 which is fixedly secured to the steering column 20 adjacent the upper end of the latter. The support 42 is circumposed about the steering shaft 22 and is arranged above and in cooperating relation with respect to the valves of the valve assembly 24, each of such valves having a protruding end portion 46, as in Figure 5.

Referring to Figure 3, there are two actuators 48 and 50 mounted in the support 42 with each having a portion adjacent the lower end projecting below the plate 44. A coil spring 52 is circumposed about each of the actuators 48 and 50 above the plate 44 and has one end resting upon the plate 44 and the other end bearing against the underside of a head 54 carried on the upper end of each actuator 48 and 50. The coil springs 52 bias the actuators 48 and 50 in their projectile and retractrile movement to the position in which they are retracted within the support 42 and out of bearing engagement with the adjacent projecting end portion 46 of the valve in the adjacent valve assembly 24.

A mounting plate 56 is circumposed about the steering shaft 22 and is positioned above the support 42 and is removably connected to the steering shaft 22 for rotation therewith by means of a nut 58 and washer 60, the upper end portion of the shaft 22 being threaded and having a tapering portion immediately below the threaded portion carrying a key 62 by means of which the mounting plate 56 is secured to the shaft 22.

At intervals of ninety degrees about the mounting plate 56 are pairs of spring actuable depressible plungers 64 and 66 mounted in the mounting plate 56 and arranged so as to cooperate with the actuators 48 and 50. Each of the plungers 64 and 66 has a coil spring 68 circumposed about it, the upper end of the coil spring bearing against the underface of a head 70 on each plunger 64 and 66 and the lower end of the coil spring bearing against the bottom of a well in which the plunger is mounted for up and down movement.

The upper face of the support 42 is provided with a pair of concentrically arranged annular grooves 72 and 74 (Figure 3) in which are loosely positioned contact elements 76 and 78, respectively, each in the form of a thrust bearing having upper and lower sections movable relative to each other and separated by conventional bearing means.

The contact rings or elements 76 and 78 are positioned between and engage the adjacent actuator 48, 50, and the associated plungers 64, 66.

An operating member, in the form of a disc, and as designated by the numeral 80, is circumposed about the shaft 22 and is positioned above the mounting plate 56 and is connected to the mounting plate 56 for limited movement in clockwise and counterclockwise directions relative to the mounting plate 56.

The upper surface of the mounting plate 56 is provided with a recess located at a point equidistant between each of the pairs of plungers 64 and 66. Such recesses are shown in Figures 2 and 3 and designated, with respect to one of the recesses, by the reference numeral 82. The underface of the operating member 80 is provided with a recess 84 in registry with each of the recesses 82. At the complemental ends of the recesses 82 and 84 are block members 86, each having a semi-cylindrical end remote from the facing ends which are provided with bores extending inwardly therefrom and forming sockets to receive end portions of a coil spring 88. The confronting faces of the block members 86 within each of the four combined recesses are spaced from each other so that the operating member 80 is permitted to turn relative to the mounting plate 56 in clockwise and counterclockwise directions, compressing the springs 88 and shifting of the block members 86 toward each other in each of the combined recesses.

The upper end portions of the heads 70 of the plungers 64 and 66 are conical, as shown in Figure 3 at 90 with respect to the plunger 66 associated with the actuator 50. The operating member 80 is provided with countersunk bores, as at 92 in Figure 4, each receiving an operator 94 having a conical lower end portion 96 engageable with the conical portion 90 of the adjacent plunger 64 or 66. Each operator 94 is in the form of an inverted headed bolt having a threaded upper end portion receiving a nut 98 for securing the operator 94 in the bore 92.

As will be seen in Figure 2 with reference to one of the pairs of plungers 64 and 66, the associated operators 94 are located on opposite sides of the plungers 64 and 66. This results in engagement of one of the operators 94 with the head 70 of one plunger 64 or 66 when the operating member 80 is rotated relative to the mounting plate 56 in one direction and engagement of the other operator 94 with the other of the plungers 64 and 66 when the operating member 80 is turned in the opposite direction relative to the mounting plate 56.

The recesses 82 in the mounting plate 56 are closed in their lower ends by removable block members 100 (Figure 3) and the recesses 84 in the operating member 80 are closed at their upper ends by other block members 102.

The mounting plate 56 constitutes a mounting means circumposed about the shaft 22 and positioned above the support 42 for rotation with the shaft 22. The operating member 80 constitutes an operating means positioned above the plate 56 and connects to the plate 56 for movement in clockwise and counterclockwise directions relative to the plate 56. The heads of the operators 94 and the heads of the plungers 64 and 66 constitute cooperating means carried by the operating member 80 and the mounting plate 56 engageable with the actuators 48 and 50 responsive to movement of the operating member 80 in clockwise and counterclockwise directions to shift the respective valves of the valve assemblies to open position, such valves being designated generally by the reference numeral 104, as shown most clearly in Figure 5.

Referring to Figure 5, the valve 104 has a bore 106 extending inwardly from the end remote from the protruding portion 46 and terminating at a point spaced from the portion 46. The valve body 108 of the assembly 24 is provided with a chamber 110 connected in communication with the adjacent end of the conduit 26 or 28. A head 112 carried on the adjacent portion of the valve 104 closes communication between the chamber 110 and the associated exhaust conduit 36 when the valve 104 is in the up position or closed position. A coil spring 114 circumposed about the upper end portion of the valve 104 biases the valve 104 upwardly until depressed by the actuation of one of the actuators 48 or 50. The valve 104 has a port 116 in its side normally in registry with the conduit 30 and permitting air to flow under pressure from the tank 34 into the chamber 110 and thence to one or the other end of the hydraulic cylinder 10 as determined by the association of the assembly 24 with either the actuator 48 or actuator 50. Depression of the valve 104 closes the port 116 and permits air to be exhausted to atmosphere from one end of the cylinder 10.

A steering wheel 118 has its hub 120 circumposed about the operating member 80 and the mounting plate 56 and the skirt of the hub 120 extends partially down over an end casing ring 122 which is circumposed about the assembled support 42 and mounting plate 56. The central portion of the steering wheel hub 120 may be adapted for installation of a conventional horn button if desired, although such horn button is not here illustrated as not being a part of the present invention.

In use, the cylinder 10 has one end pivotally mounted upon an upright bracket 124 which is secured to the axle 126 of the vehicle. The actuating rod 16 of the cylinder 10 is connected by means of the clamp 18 to the tie rod 14, and so positioned as to be movable back and forth in response to the admission or exhaustion of air into the cylinder 10 on either side of the piston 12.

The valve assemblies 24 are connected by the conduit 30 to a source of air under pressure with the valve 32 in a position so as to be accessible to the operator of the vehicle. The conduit 30 is normally in communication with each of the conduits 26 and 28 and pressure is equal on each side of the piston 12. Upon turning of the steering wheel in one direction, the operating member 80 is caused to rotate relative to the mounting plate 56, compressing the springs 88 and shifting one or other of the operators 94 into contact with the conical portion 90 of the plunger 64 or 66, depending upon which way the steering wheel is rotated. The camming action of one of the operators 94 with the conical head portion 90 effects the downward movement of the respective plunger 64, 66 and this motion is transmitted through the contact rings or elements 76 and 78 to the respective actuator 48 or 50, and through the actuator 48 or 50 to the respective valve 104, depressing the latter and opening communication between the conduit 26 or 28 to the atmosphere through the exhaust conduit 36 of the respective valve assembly 24. This effects the lowering of the pressure on one side of the piston 12, shifting the latter to impart linear motion to the tie rod 14 in the proper direction. Upon release of the steering wheel, the springs 88 effect movement of the steering wheel to the normal position, closing communication between the cylinder 10 and the atmosphere and again shifting the port 116 of the affected valve assembly 24 into registry with the conduit 30 and again applying pressure equally to both sides of the piston 12 until such time as the steering wheel 118 is again rotated relative to the operating member 80.

What is claimed is:

1. The combination with an air cylinder having a piston mounted therein for reciprocatory movement, air under pressure within said cylinder on each side of said piston, a tie rod connected to said piston for movement therewith, a steering shaft rotatable in clockwise and counterclockwise directions, at least two valve assemblies each having a depressible valve in closed position positioned exteriorly of and about said steering shaft, a first conduit connecting one of said valve assemblies to said cylinder adjacent one end thereof, a second conduit connecting the other of said valve assemblies to said cylinder adjacent the other end thereof, of a power mechanism comprising a fixed support circumposed about said shaft and arranged above and in cooperating relation with respect to the valves of said valve assemblies, at least two actuators each mounted in said support for projectile and retractile movement disposed so that they are in cooperating relation with respect to the valves of said valve assemblies, a mounting plate circumposed about said steering shaft and positioned above said support and connected to said steering shaft for rotation therewith, at least two spring actuable plungers carried by said mounting plate and arranged so as to cooperate with said actuators, a contact element between and engaging each of the adjacent actuators and plungers and carried by said support, an operating member circumposed above said shaft and positioned above said mounting plate and connected to said mounting plate for limited movement in clockwise and counterclockwise directions relative to said mounting plate, and at least two operators carried by said operating member and arranged so as to cooperate with said plungers, said operating member upon execution of its movement in the clockwise direction relative to said mounting plate causing one of the operators to depress the adjacent plunger, actuator, and valve of one of the valve assemblies to exhaust air from the cylinder through the adjacent conduit, and move the piston in one direction within said cylinder, and upon execution of its movement in the counterclockwise direction relative to said mounting plate causing the other of said operators to depress the adjacent plunger, actuator, and valve of the other of the valve assemblies, to exhaust air from the cylinder through the adjacent conduit, and move the piston in the other direction within said cylinder.

2. The combination with an air cylinder having a piston mounted therein for reciprocatory movement, air under pressure within said cylinder on each side of said piston, a tie rod connected to said piston for movement therewith, a steering shaft rotatable in clockwise and counterclockwise directions, at least two valve assemblies each having a depressible valve in closed position positioned exteriorly of and about said steering shaft, a first conduit connecting one of said valve assemblies to said cylinder adjacent one end thereof, a second conduit connecting the other of said valve assemblies to said cylinder adjacent the other end thereof, of a power mechanism comprising a fixed support circumposed about said shaft and arranged above and in cooperating relation with respect to the valves of said valve assemblies, at least two actuators each mounted in said support for projectile and retractile movement disposed so that they are in cooperating relation with respect to the valves of said valve assemblies, a mounting plate circumposed about said steering shaft and positioned above said support and connected to said steering shaft for rotation therewith, at least two spring actuable depressible plungers carried by said mounting plate and arranged so as to cooperate with said actuators, means operatively connecting each of said plungers to the adjacent actuator so that depression of said plunger by a manually applied force actuates said actuator, an operating member circumposed above said shaft and positioned above said mounting plate and connected to said mounting plate for limited movement in clockwise and counterclockwise directions relative to said mounting plate, and at least two operators carried by said operating member and arranged so as to cooperate with said plungers, said operating member upon execution of its movement in the clockwise direction relative to said mounting plate causing one of the operators to depress the adjacent plunger, actuator, and valve of one of the valve assemblies to exhaust air from the cylinder through the adjacent conduit, and move the piston in one direction within said cylinder, and upon execution of its movement in the counterclockwise direction relative to said mounting plate causing the other of said operators to depress the adjacent plunger, actuator, and valve of the other of the valve assemblies, to exhaust air from the cylinder through the adjacent conduit, and move the piston in the other direction within said cylinder.

3. The combination with an air cylinder having a piston mounted therein for reciprocatory movement, air under pressure within said cylinder on each side of said piston, a tie rod connected to said piston for movement therewith, a steering shaft rotatable in clockwise and counterclockwise directions, at least two valve assemblies each having a depressible valve in closed position positioned exteriorly of and about said steering shaft, a first conduit connecting one of said valve assemblies to said cylinder adjacent one end thereof, a second conduit connecting the other of said valve assemblies to said cylinder adjacent the other end thereof, of a power mechanism comprising a fixed support circumposed about said shaft and arranged above and in cooperating relation with respect to the valves of said valve assemblies, at least two actuators each mounted in said support for projectile and retractile movement disposed so that they are in cooperating relation with respect to the valves of said valve assemblies, a mounting plate circumposed about said steering shaft and positioned above said support and connected to said steering shaft for rotation therewith, at least two spring actuable plungers carried by said mounting plate and arranged so as to cooperate with said actuators, a contact ring between and engaging each of the adjacent actuators and plungers and carried by said support, an operating member circumposed above said shaft and positioned above said mounting plate and connected to said mounting plate for limited movement in clockwise and counterclockwise directions relative to said mounting plate, at least two operators carried by said operating member and arranged so as to cooperate with said plungers, said operating member upon execution of its movement in the clockwise direction relative to said mounting plate causing one of the operators to depress the adjacent plunger, actuator, and valve of one of the valve assemblies to exhaust air from the cylinder through the adjacent conduit, and move the piston in one direction within said cylinder, and upon execution of its movement in the counterclockwise direction relative to said mounting plate causing the other of said operators to depress the adjacent plunger, actuator, and valve of the other of the valve assemblies, to exhaust air from the cylinder through the adjacent conduit, and move the piston in the other direction within said cylinder, and spring means operatively connected to said operating member for urging the latter in the clockwise direction when the operating member is moved in the counterclockwise direction relative to said mounting plate and urging said operating member in the counterclockwise direction when said operating member is moved in the clockwise direction relative to said mounting plate.

4. The combination with an air cylinder having a piston mounted therein for reciprocatory movement, air under pressure within said cylinder on each side of said piston, a tie rod connected to said piston for movement therewith, a steering shaft rotatable in clockwise and counterclockwise directions, at least two valve assemblies each having a depressible valve in closed position positioned exteriorly of and about said steering shaft, a first conduit connecting one of said valve assemblies to said cylinder adjacent one end thereof, a second conduit connecting the other of said valve assemblies to said cylinder adjacent the other end thereof, of a power mechanism comprising a fixed support circumposed about said shaft and arranged above and in cooperating relation with respect to the valves of said valve assemblies, at least two actuators each mounted in said support for projectile and retractile movement disposed so that they are in cooperating relation with respect to the valves of said valve assemblies, a mounting plate circumposed about said steering shaft and positioned about said support and connected so said steering shaft for rotation therewith, at least two spring actuable plungers carried by said mounting plate and arranged so as to cooperate with said actuators, a contact ring between and engaging each of the adjacent actuators and plungers and carried by said support, a disc-shaped operating member circumposed about said shaft and positioned above said mounting plate and connected in said mounting plate for limited movement in clockwise and counterclockwise directions relative to said mounting plate, hand actuable means operatively connected to said operating member for effecting the movements of the latter, and at least two operators carried by said operating member and arranged so as to cooperate with said plungers, said operating member upon execution of its movement in the clockwise direction relative to said mounting plate causing one of the operators to depress the adjacent plunger, actuator, and valve of one of the valve assemblies to exhaust air from the cylinder through the adjacent conduit, and move the piston in one direction within said cylinder, and upon execution of its movement in the counterclockwise direction relative to said mounting plate causing the other of said operators to depress the adjacent plunger, actuator, and valve of the other of the valve assemblies, to exhaust air from the cylinder through the adjacent conduit, and move the piston in the other direction within said cylinder.

5. The combination with an air cylinder having a piston mounted therein for reciprocatory movement, air under pressure within said cylinder on each side of said piston, a tie rod connected to said piston for movement therewith, a steering shaft rotatable in clockwise and counterclockwise directions, at least two valve assemblies each having a depressible valve in closed position positioned exteriorly of and about said steering shaft, a first conduit connecting one of said valve assemblies to said cylinder adjacent one end thereof, a second conduit connecting the other of said valve assemblies to said cylinder adjacent the other end thereof, of a power mechanism comprising a fixed support circumposed about said shaft and arranged above and in cooperating relation with respect to the valves of said valve assemblies, at least two actuators each mounted in said support for projectile and retractile movement disposed so that they are in cooperating relation with respect to the valves of said valve assemblies, mounting means circumposed about said shaft and positioned above said support and connected to said steering shaft for rotation therewith, operating means positioned above said mounting means and connected to said mounting means for movement in clockwise and counterclockwise directions relative to said mounting means, and cooperating means carried by said operating means and mounting means and engageable with the actuators responsive to the movement of said operating means in clockwise and counterclockwise directions to shift the respective valves of said valve assemblies to open position.

6. The combination with an air cylinder having a piston mounted therein for reciprocatory movement, air under pressure within said cylinder on each side of said piston, a tie rod connected to said piston for movement therewith, a steering shaft rotatable in clockwise and counterclockwise directions, at least two valve assemblies each having a depressible valve in closed position positioned exteriorly of and about said steering shaft, a first conduit connecting one of said valve assemblies to said cylinder adjacent one end thereof, a second conduit connecting the other of said valve assemblies to said cylinder adjacent the other end thereof, of a power mechanism comprising a fixed support circumposed about said shaft and arranged above and in cooperating relation with respect to the valves of said valve assemblies, at least two actuators each mounted in said support for projectile and retractile movement disposed so that they are in cooperating relation with respect to the valves of said valve assemblies, mounting means circumposed about said shaft and positioned above said support and connected to said steering shaft for rotation therewith, operating means positioned above said mounting means and connected to said mounting means for movement in clockwise and counterclockwise directions relative to said mounting means, cooperating means carried by said operating means and mounting means and engageable with the actuators responsive to the movement of said operating means in clockwise and counterclockwise directions to shift the respective valves of said valve assemblies to open position, and hand actuable means operatively connected to said operating means for effecting the movement of the latter.

References Cited in the file of this patent

UNITED STATES PATENTS

| | | |
|---|---|---|
| 1,774,634 | Coates | Sept. 2, 1930 |
| 1,990,530 | Dobson | Feb. 12, 1935 |
| 2,037,505 | Eaton | Apr. 14, 1936 |
| 2,180,430 | Reitz | Nov. 21, 1939 |
| 2,685,342 | Lauck | Aug. 3, 1954 |
| 2,730,075 | Edge et al. | Jan. 10, 1956 |